March 2, 1971     I. S. SHAH     3,567,400

APPARATUS FOR OXIDATION OF BLACK LIQUOR

Filed April 1, 1968     5 Sheets-Sheet 1

INDRAVADAN S. SHAH
INVENTOR.

BY
AGENT

INDRAVADAN S. SHAH
INVENTOR.
BY *J. T. Chaboty*
AGENT

United States Patent Office 3,567,400
Patented Mar. 2, 1971

3,567,400
APPARATUS FOR OXIDATION OF BLACK LIQUOR
Indravadan S. Shah, Forest Hills, N.Y., assignor to Chemical Construction Corporation, New York, N.Y.
Filed Apr. 1, 1968, Ser. No. 717,740
Int. Cl. C01b 17/22; D21c 11/02
U.S. Cl. 23—260
4 Claims

ABSTRACT OF THE DISCLOSURE

The apparatus for black liquid oxidation features a vertically oriented container which is provided with an internal horizontal perforated plate and at least one internal vertical baffle plate which extends upwards from the horizontal perforated plate. An air stream is passed via a fan or blower into the container below the perforated plate and air stream portions rise through the perforations. A stream of black liquor is passed via a pump and liquor seal inlet box into one end of the container above the perforated plate, and flows horizontally across the upper surface of the perforated plate parallel with and around the ends of the vertical baffle plates in a sinuous or serpentine flow path. The black liquor stream thus flows transverse to and in contact with the air stream portions rising through the plurality of perforations. The air stream portions are thereby dispersed into the black liquor stream, and the black liquor is oxidized with the concomitant generation of a foam. The resulting mixture of air, foam and oxidized black liquor is removed horizontally from an outlet end of the container above the perforated plate, via a substantially horizontal outlet conduit usually provided with a lower weir or other means for maintaining a liquor level on the perforated plate, and the mixture is passed to a vertically oriented defoaming vessel, which is provided with a lower outlet for removal of oxidized black liquor free of foam, upper mechanical means for breaking foam into separate liquid and gaseous phases, so that the liquid phase returns to the main body of oxidized liquor in the lower part of the vessel, and means to discharge the separated gaseous phase to atmosphere.

BACKGROUND OF THE INVENTION

Field of the invention

Figure 1:
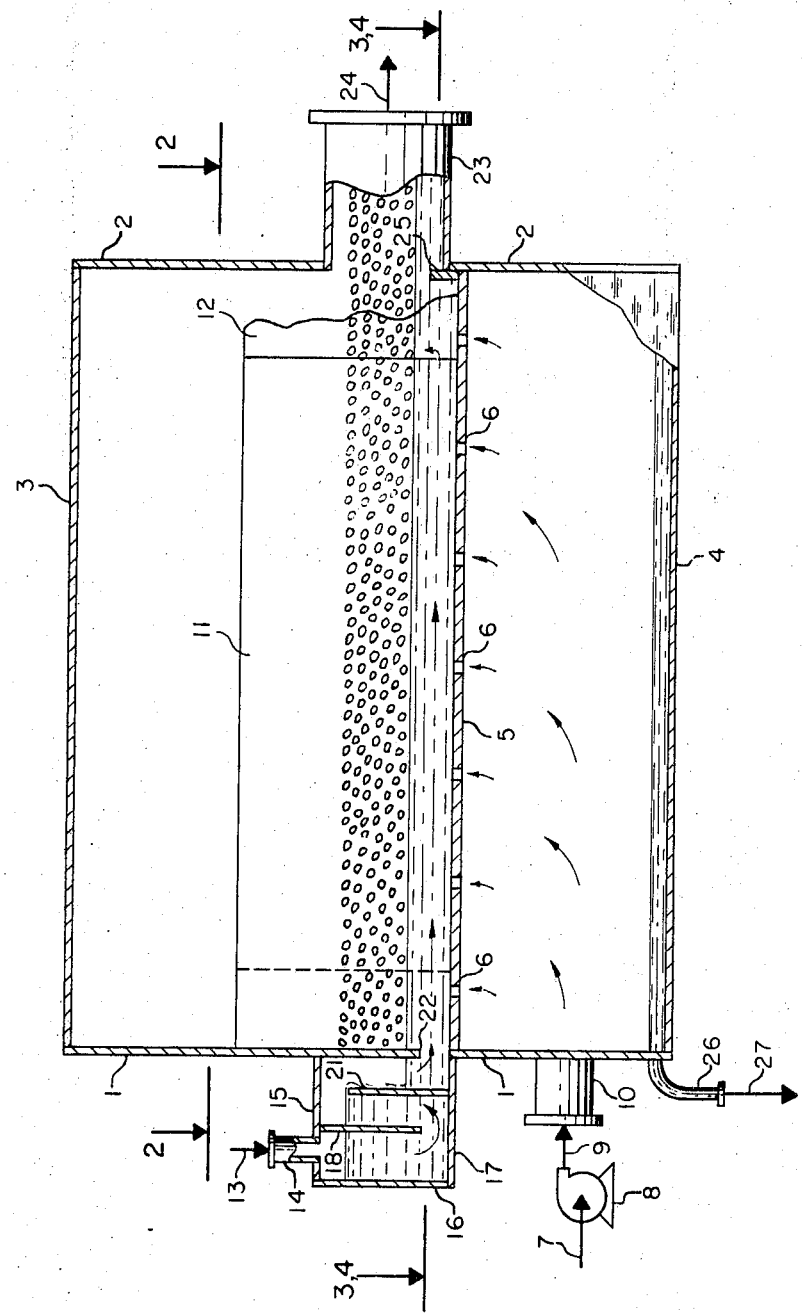

The invention relates to the processing of black liquor, which is produced during the digestion or processing of wood pulp. The black liquor is effectively oxidized in an improved apparatus, prior to evaporative concentration and recycle. The improved apparatus serves to contact the black liquor with an oxidation air stream, which converts sulfides to sulfates and thiosulfates, and prevents pollution and the loss of sulfur compounds during the subsequent processing of the black liquor.

Description of the prior art

In the kraft pulping industry, oxidation of black liquor has been widely practiced. Black liquor oxidation is now an integral part of the kraft pulping and recovery process, rather than a requirement to solve air and water pollution problems. This is a direct result of various benefits, such as increased sulfidity, lower lime requirement, reuse of evaporator condensate, etc., attained due to oxidation of black liquor. In addition, black liquor oxidation has become an integrated part of the kraft recovery process because of its high potential for reducing pollution and because of its potential for reducing sulfur losses. The development of various oxidation systems is a direct result of continuing research to reduce the emission of odorous gases which contribute to the typical characteristic odors associated with kraft pulping.

From an air pollution point of view, the retention of sulfur compounds such as mercaptides, sulfides and disulfides in black liquor by stabilization is very essential. The concentration of the various constituents in the black liquor varies from mill to mill, as well as from time to time within a mill. The reasons for this are variations in the operating conditions, the type of wood being used and the type of pulp being produced. However, it is well established that sulfur compounds such as mercaptides, sulfides and disulfides are present in all cases.

The oxidation of black liquor converts the sodium sulfide content to sodium thiosulfate or sodium sulfate. When oxidized liquor is fired into the recovery furnace, the sodium thiosulfate will decompose in the furnace to sodium sulfite and sulfur. In an oxidizing atmosphere, which is usually present in the furnace, the elemental sulfur is converted to sulfur dioxide which reacts with sodium carbonate to form sodium sulfite. All of the sodium sulfite formed in the furnace is usually further oxidized to sodium sulfate.

The amount of sulfur dioxide emission from the recovery furnace is proportioned to the concentration of sodium thiosulfate in the black liquor. Theoretically, for every mole of sodium sulfide oxidized, one-half mole of sulfur dioxide should be emitted. However, due to high availability of sodium carbonate in the recovery furnace, the actual emission is less. It is an observed fact that for a mill practicing oxidation, the sulfur dioxide concentration in the flue gases leaving the recovery furnace should increase. This sulfur dioxide is readily and efficiently absorbed in a suitable gas scruber, such as a venturi contactor.

The oxidation of weak black liquor offers more benefits than strong black liquor oxidation. In mills using pine wood furnish, weak black liquor oxidation has not been practiced due to the formation of excessive foam which has been found difficult to handle. In some mills, the pine content of wood furnish may be as high as 60%, and excessive foam formation has been a problem which precluded the successful operation of an oxidation system for efficient oxidation of the weak black liquor and disposition of the foam.

During concentration of unoxidized black liquor in multiple effect evaporators, as a result of hydrolysis, sodium sulfides and mercaptides are converted to hydrogen sulfide and methyl mercaptans. Because of their low vapor pressure, methyl mercaptans, hydrogen sulfide and methyl sulfide will be released, and thus the multiple effect evaporator becomes one of the largest sources of gaseous sulfur losses in the kraft recovery process.

The recovery furnace is the largest single source of gaseous sulfur losses in the form of hydrogen sulfide, sulfur dioxide, mercaptans and disulfides. Another source for emission of gaseous sulfur loss is the direct contact evaporators, where carbon dioxide from recovery furnace flue gases reacts with sodium sulfide of black liquor, and thus releases hydrogen sulfide. The digester and blow tank are two other sources of gaseous sulfur compound emission. As much as 30 to 50 kg. of sulfur compounds are lost per ton of pulp produced if no special attention is given to prevent these losses.

Several methods have been proposed for reducing the gaseous sulfur losses from pulp mills. Among the various methods available for reduction of odor and sulfur losses, black liquor oxidation is found to be the most effective in reducing sulfur losses from multiple effect evaporators, direct contact evaporators and recovery furnace. In addition to reduction in odorous gaseous emission, the oxidation of black liquor offers other advantages in most instances of application. One advantage is the possibility of attaining higher sulfidity of cooking liquor than is ordinarily possible with salt cake makeup. Another advantage is the possible reuse of multiple effect evaporator condensate in the pulp mill. An advantage is a reduction in lime requirement for causticizing due to increased sulfidity. When increased sulfidity is not desired, soda ash or caustic soda may be used as partial alkali makeup. If added to the direct contact evaporator or scrubber, an increase in absorption of hydrogen sulfide and sulfur dioxide can be obtained. Another advantage of black liquor oxidation is increased soap yield. An advantage is more improved and uniform operation of multiple effect evaporators. In general, there is also a reduction of corrosion in the apparatus of the system and process units. An advantage is obtained due to an improvement in the combustion properties of black liquor when burned in the recovery furnace. Finally, a significant reduction in chemical loss is achieved.

The prior art relative to the processing, evaporation and combustion of black liquor includes U.S. Patents Nos. 1,996,526; 2,027,115; 2,064,953 and 2,333,193, and U.S. patent application No. 704,054 filed Feb. 8, 1968. Other patents relative to the contact between gas or vapors and liquids or solids include U.S. Patents Nos. 2,378,157; 2,564,078; 2,591,343 and 3,172,922.

SUMMARY OF THE INVENTION

In the present invention, an improved apparatus is provided for the oxidation of black liquor. The apparatus is usually employed to oxidize weak or dilute black liquor, prior to evaporative concentration of the weak black liquor in multiple effect or direct contact evaporators, which is usually followed by combustion of the concentrated black liquor with air in a recovery furnace to produce a smelted solid salts mixture principally containing sodium sulfate and sodium carbonate. The solid salts mixture is removed from the recovery furnace and dissolved in water or aqueous wash liquor to produce green liquor which is recycled to pulp processing.

The apparatus of the present invention includes a container which is provided with an internal horizontal perforated plate which serves as an aerator element. The aerator element forms a floor which is divided into a plurality of sections by a baffle arrangement, with at least one vertical baffle extending upwards from the floor within the container. The size of the perforations in the floor and the pattern of the perforations are designed so as to provide optimum-size air bubbles, maximum contact surface and uniform distribution of air. The air from below the floor passes upwards through the perforations of the aerator element and contacts the liquor which is flowing in a zigzag manner on the upper surface of the aerator element, due to diversion into a sinuous or serpentine flow path by the upper-vertical baffle plates. A contact phenomena takes place between the rising air bubbles and the black liquor flowing on the upper surface of the perforated aerator plate, and a bubbling action occurs in the oxidizer unit. All air, oxidized liquor and foam then pass through an outlet duct into a foam tank, where air and foam are separated from liquor. The air and foam then pass through a foam breaker, where foam is converted to liquor and clean air is discharged to atmosphere.

The apparatus of the present invention provides several advantages. The system provides essentially 100% oxidation efficiency, even with variations in liquor flow and sodium sulfide content. The total operating horsepower, including fan, pump and foam breakers, is relatively low. The apparatus is relatively simple to fabricate and maintain. The extensive and stable foam that is formed during oxidation is efficiently handled and causes no operating problems. As a result of the oxidation of weak black liquor, the sulfidities of green and white liquors are raised, and the total lime requirement is reduced. The hydrogen sulfide concentration in the gases leaving the recovery furnace stack is essentially negligible. The biochemical oxygen demand for multiple effect evaporator condensate is substantially reduced and the pH is raised to an alkaline range, thus making the evaporator condensate suitable for reuse in the pulp mill. On the overall, a significant reduction in odor and chemical loss is achieved, as a direct result of the weak black liquor oxidation system.

It is an object of the present invention to oxidize black liquor in an improved manner.

Another object is to provide an improved apparatus for the oxidation of black liquor.

A further object is to provide an apparatus for black liquor oxidation which is relatively simple to fabricate, operate and maintain.

An additional object is to provide an apparatus which attains substantially complete oxidation of black liquor, regardless of variations in liquor flow rate and sodium sulfide content.

Still another object is to provide an apparatus for black liquor oxidation which efficiently handles the extensive and stable foam which is formed during oxidation, and causes no operating problems.

These and other objects and advantages of the present invention will become evident from the description which follows.

DESCRIPTION OF THE DRAWINGS AND PREFERRED EMBODIMENTS

Figure 2:
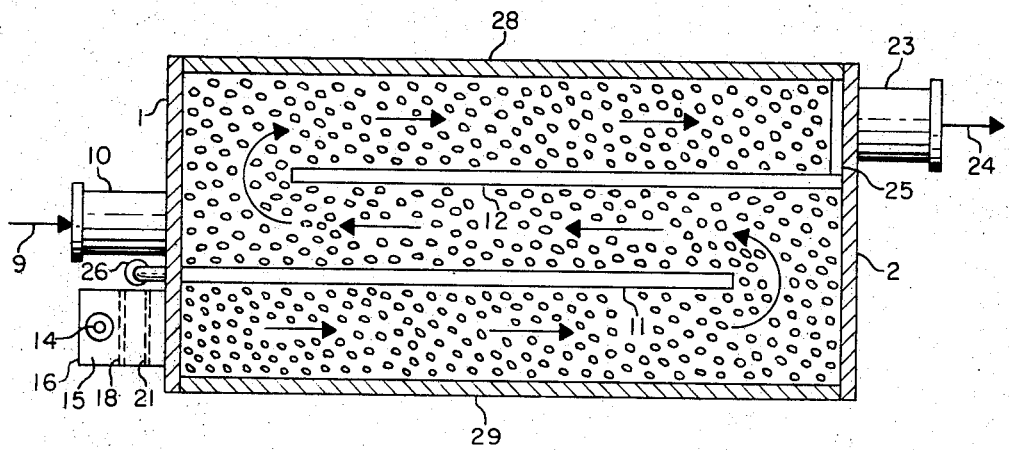
Figure 3:
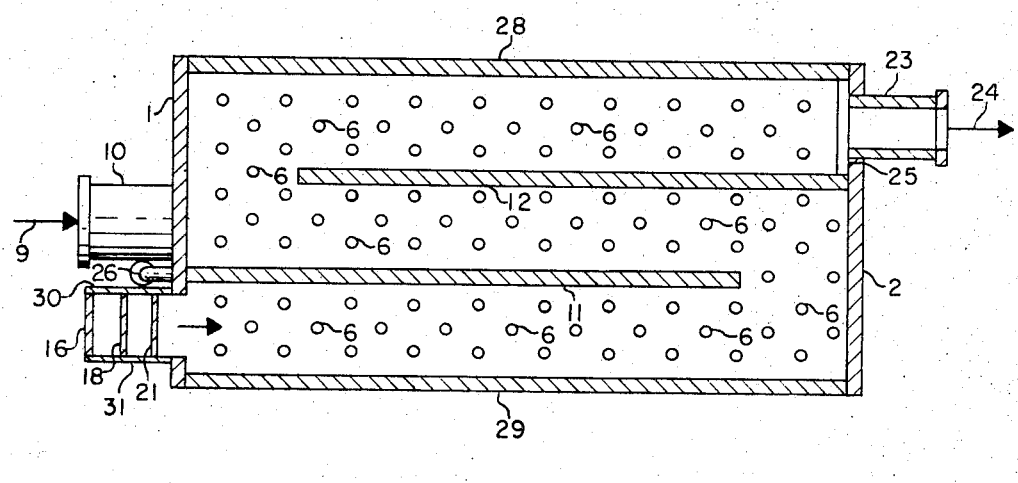
Figure 4:
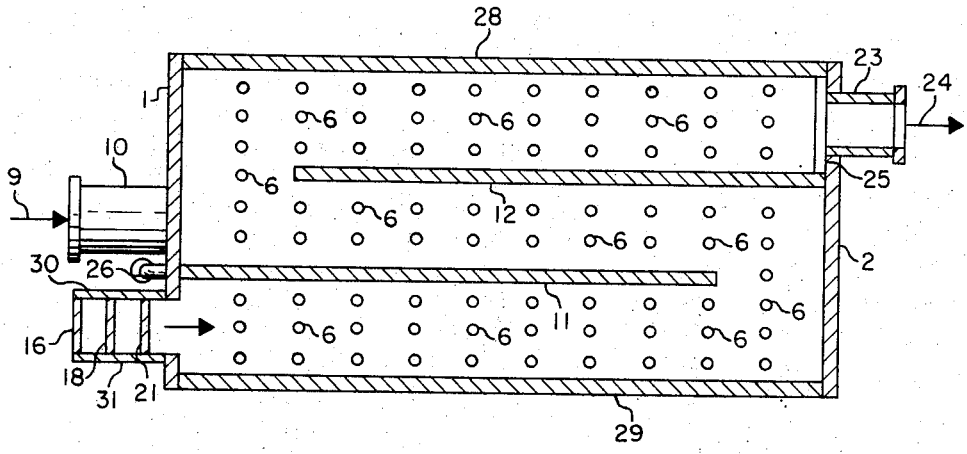
Figure 7:
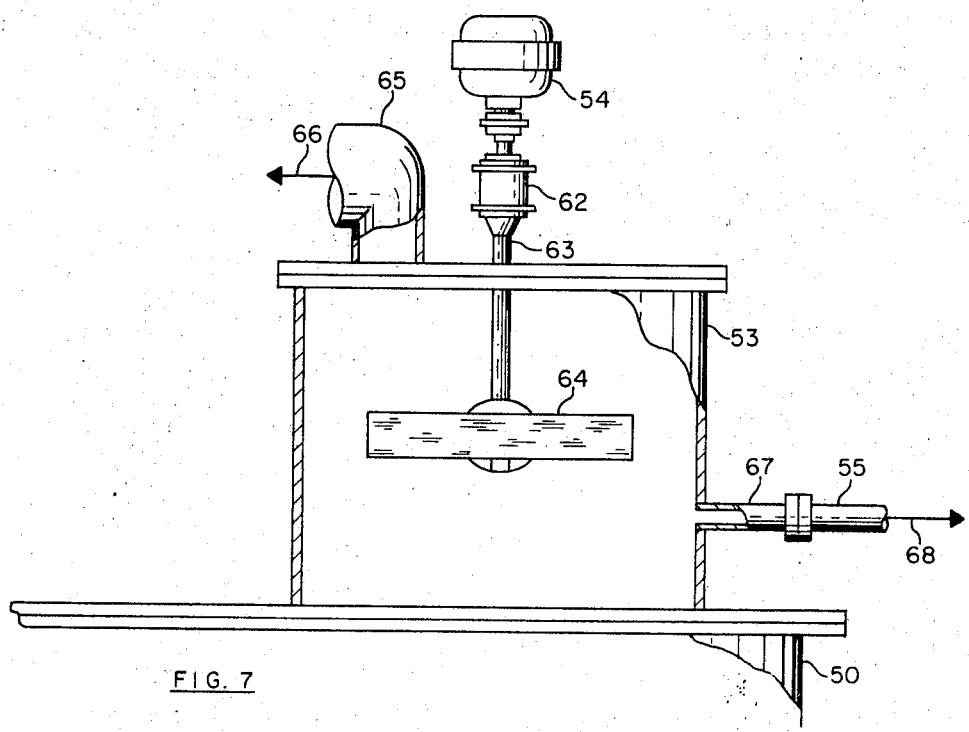
Figure 5:
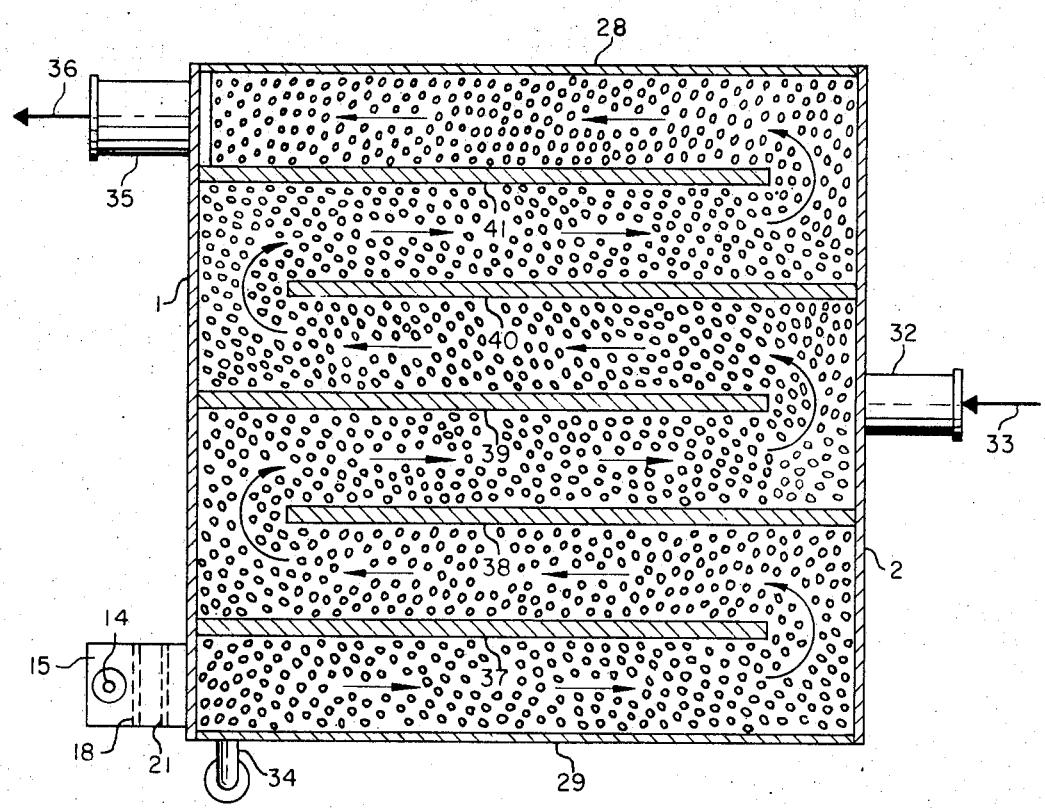
Figure 6:
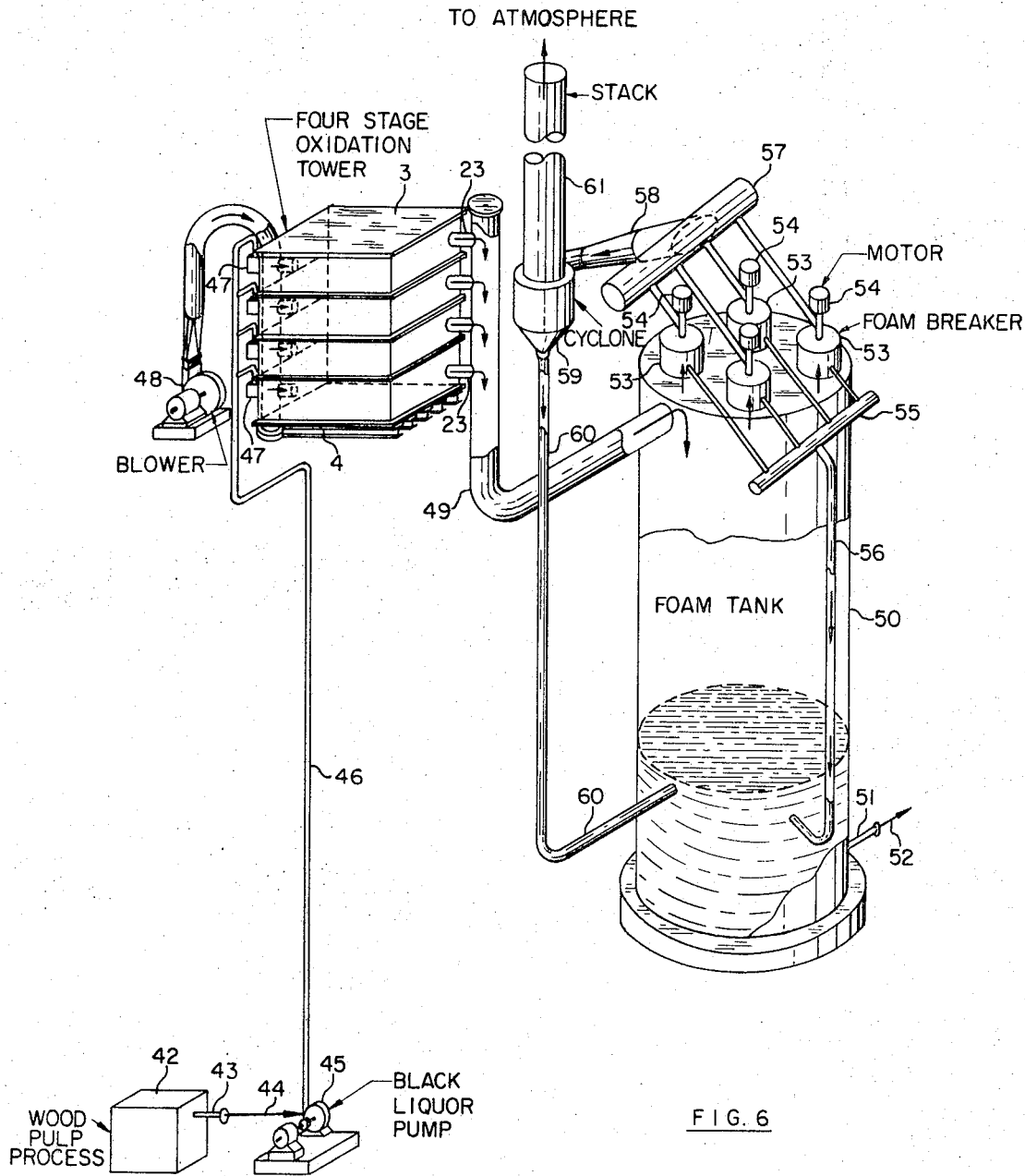

Referring now to the drawings, FIG. 1 is a sectional elevation view of the black liquor oxidizer of the present invention, FIG. 2 is a sectional plan view of FIG. 1, taken on section 2—2 and illustrating the flow of liquor and foam through the oxidizer, FIGS. 3 and 4 are sectional plan views of FIG. 1, taken on sections 3—3 and 4—4, and illustrating alternative arrangements of the perforations in the perforated horizontal baffle or plate, FIG. 5 is a plan view of an alternative embodiment of the invention, showing foam and liquor flow in an oxidizer provided with five flow diversion baffles, FIG. 6 is an isometric elevation view of the entire apparatus combination of the invention in schematic arrangement, and FIG. 7 illustrates one type of foam breaker which may be employed in accordance with the present invention.

Referring now to FIG. 1, the black liquor oxidizer is shown in sectional elevation view and includes a container having vertical side walls 1 and 2, a top closure plate 3 and a bottom closure plate 4. A horizontal air diffusion plate 5 is disposed within the oxidizer and spaced between plates 3 and 4. The entire perimeter of plate 5 is in contact with the side walls of the container, including walls 1 and 2, so as to divide the oxidizer into a lower chamber and an upper chamber. The air diffusion plate 5 is foraminous, and is provided with a plurality of spaced apart perforations 6. An air stream 7, which usually consists of ambient or pre-heated air, is passed via fan or blower 8 and stream 9 into inlet nozzle 10, which passes the pressurized air into the lower chamber of the oxidizer below plate 5. The air stream divides into a plurality of portions below plate 5, and a portion of the air stream flows upwards through each perforation 6.

Vertically oriented baffle plates such as plates 11 and 12 extend upwards in the upper chamber of the oxidizer from plate 5, and the plates 11 and 12 usually terminate below the top plate 3, although in suitable instances the baffle plates 11 and 12 may extend upwards and terminate in contact with plate 3. As will appear infra, plates 11 and 12 usually terminate below top cover plate 3 in order to permit free flow of foam above the baffle plates 11 and 12, in addition to foam flow adjacent to the sides of the plates 11 and 12. One vertical end of the front baffle plate 11 is in contact with the side wall 1 of the oxidizer, while the opposite vertical end of baffle plate 11 is spaced away from the wall 2. The rear baffle plate 12 is disposed with one vertical end, not shown, in contact with the side wall 2 of the oxidizer, and the opposite vertical end of plate 12 is spaced away from the wall 1.

A black liquor stream 13 derived from wood pulp processing, and usually consisting of weak black liquor having in the range of about 10% to 30% solids content including 1 to 10 grams per liter of sodium sulfide content, is passed via inlet nozzle 14 into a feed box which includes top plate or roof 15, outer side wall 16 and bottom plate or floor 17, and which is juxtaposed adjacent to the side wall 1 of the oxidizer. The feed box serves to distribute the black liquor stream 13 into the oxidizer as a uniform liquid layer on the upper surface of plate 5. The feed box is provided with an internal vertical baffle 18 which extends downward from top plate 15 adjacent to nozzle 14 and terminates above bottom floor 17. The black liquor stream 13 flows downwards within the feed box between the outer side wall 16 and baffle 18, and inwards between the bottom end of baffle 18 and the bottom floor 17. A second internal vertical baffle 21 is also provided within the feed box. Baffle 21 extends upwards from the bottom plate 17 between baffle 18 and wall 1, and terminates below the top plate 15. The black liquor flowing inwards below baffle 18 thereafter flows upwards between baffle 18 and baffle 21, over the top of baffle 21, downwards as a uniform layer of black liquor between baffle 21 and wall 1, and through the opening 22 from the feed box into the oxidizer and onto the upper surface of plate 5 as a uniform layer of black liquor.

The film or layer of black liquor flows across the upper surface of plate 5 adjacent to one side of baffle 11, and transverse to and in contact with the air stream portions rising through the plurality of perforations 6. The air stream portions are dispersed into the layer of black liquor, and the layer or stream of black liquor is oxidized and a foam is generated. In most instances, substantially complete oxidation of the sodium sulfide content of the black liquor to a mixture of sodium thiosulfate and sodium sulfate takes place on the upper surface of plate 5. The mixture of foam and black liquor flows across plate 5 in a sinuous or serpentine flow path, first flowing horizontally between one side of baffle 11 and the front wall of the oxidizer, then between baffles 11 and 12, and finally between baffle 12 and the rear wall of the oxidizer. The path of this foam-black liquor flow will be more fully apparent infra, in the description of FIG. 2. In some instances, the initial passage of the layer of black liquor through opening 22 will result in the evolution of a relatively large amount of foam, which will be accommodated by flowing over the upper end of baffle 11.

The resultant mixture of foam and oxidized black liquor is discharged from the oxidizer through a circular outlet opening in side wall 2, from which the cylindrical horizontal outlet conduit 23 discharges the mixture via stream 24, which is passed to subsequent processing to break the foam and produce an oxidized black liquor free of foam, as will appear infra. The bottom of the opening in wall 2 and the bottom of conduit 23 are generally contiguous with the plate 5, and a removable or adjustable vertical weir 25 is usually disposed across the lower part of the circular opening or conduit 23, in order to maintain a layer of black liquor on the upper surface of plate 5. The weir 25 usually has a horizontal upper end, an extends between the end of baffle 12 and the rear wall of the oxidizer, as will appear infra.

In some instances, a small amount of black liquor will trickle or otherwise flow downwards through the perforations 6, and a body of black liquor will collect in the lower chamber of the oxidizer on bottom plate 4. In order to prevent buildup of black liquor in the lower chamber of the oxidizer, which could result in partial or total blockage of air flow inwards through nozzle 10, a lower liquid outlet nozzle 26 is provided, which extends from an opening in side wall 1 adjacent to bottom plate 4, and which removes collected black liquor from the upper surface of plate 4 via stream 27. The removed black liquor stream 27 will usually be passed to a black liquor feed tank, for recycle via stream 13.

Referring now to FIG. 2, a sectional plan view of the oxidizer is shown, taken on upper section 2—2 of FIG. 1. The flow of air stream 9 into the oxidizer via nozzle 10 is shown, as well as the flow diversion baffles 11 and 12 and the serpentine flow of foam around the baffles 11 and 12. Black liquor is admitted to the oxidizer feed box via nozzle 14 which extends through top cover 15. The black liquor feed is regulated between outer side wall 16 and baffle 18, then between baffles 18 and 21, and finally the feed stream of black liquor flows from the inner surface of baffle 21 into the oxidizer and onto perforated plate 5, not shown, below the foam layer. The mixture of foam and black liquor flows horizontally between front wall 29 and flow diversion baffle 11, around the end of baffle 11 spaced away from side wall 2, between baffles 11 and 12, around the end of baffle 12 spaced away from side wall 1, and between baffle 12 and rear wall 28, and thus the foam-black liquor mixture follows a sinuous or serpentine flow path within the oxidizer. As will be apparent infra, air stream portions are continuously discharged into the foam-black liquor mixture through perforations 6 as the mixture flows through the oxidizer. The foam-black liquor mixture then flows over the weir 25, which extends horizontally between the vertical end of baffle 12 and the rear wall 28, and the mixture is finally discharged from the oxidizer via nozzle 23 as stream 24. Any black liquor which flows into the lower chamber of the oxidizer is removed via nozzle 26.

Referring now to FIG. 3, a lower sectional plan view of the oxidizer is shown, which illustrates one suitable arrangement of the perforations 6 in the plate 5, in which the perforations 6 in the horizontal perforated plate 5 are uniformly distributed, with each perforation being spaced a constant distance from adjacent perforations. In addition, FIG. 3 shows a sectional view of the rear wall 30 and the front wall 31 of the black liquor feed box, as well as the baffles 18 and 21.

FIG. 4 illustrates an alternative arrangement of the perforations 6 in the plate 5, in which the perforations 6 in the horizontal perforated plate 5 are circular perforations aligned in parallel linear rows, with the centers of the perforations in each row being aligned on straight lines.

In FIGS. 1–4, an arrangement is shown in which an even total number of vetrical flow diversion baffles is shown, specifically the two baffles 11 and 12, and in suitable instances one or a greater total number of baffles than two may be provided. In instances when an even total number of baffles plates such as 11 and 12 is provided, the black liquor stream is admitted into the oxidizer container through an inlet opening at a first corner of the container, and the resulting mixture of foam and oxidized black liquor is removed from the container through an outlet opening at a second corner of the container which is diagonally opposed to the first corner. In addition, FIGS. 2–4 illustrate an embodiment of the invention in which the oxidizer container is rectangular in horizontal cross-section.

FIG. 5 is a sectional plan view which illustrates an embodiment of the invention in which an odd total number of baffles is provided, specifically five flow diversion baffles, and the oxidizer container is square in horizontal cross-section. In addition, since an odd total number of flow diversion baffles is provided in FIG. 5, the black liquor stream is admitted into the container through an inlet opening at a first corner of the container, and the resulting foam-oxidized black liquor mixture is removed from the container through an outlet opening at a second corner which is adjacent to the first corner. In other respects, the oxidizer of FIG. 5 is similar to the oxidizer embodiments previously described.

Referring to FIG. 5, the black liquor stream is admitted via nozzle 14 through top cover plate 15 of the feed box, and the black liquor is distributed as a layer or film by baffles 18 and 21. An oxidizing air stream is admitted into the lower chamber of the container below the perforated plate, not shown, via nozzle 32 as stream 33. Black liquor which trickles or drips into the lower chamber is removed from the container via nozzle 34, while the upper outlet nozzle 35 removes a mixture of foam and black liquor via stream 36.

The oxidizing action of the oxidizer unit of FIG. 5 is similar to the operation of the oxidizer described supra, except that the number of parallel vertically oriented baffle plates is five, with the parallel baffle plates being spaced apart and extending upwards within the container from the perforated or foraminous plate, not shown. Alternate baffle plates extend from contact with side wall 1 of the container and terminate adjacent to the opposite side wall 2 of the container, while the remaining baffle plates extend from contact with side wall 2 and terminate adjacent to wall 1. The feed layer of black liquor, and generated foam, flow between front wall 29 and vertical flow diversion baffle 37, and then sucessively in alternately reversing flow directions between baffles 37 and 38, 38 and 39, 39 and 40 and 40 and 41. The mixture finally flows between baffle 41 and rear wall 28, and is discharged via outlet nozzle 35 as stream 36. The baffles 37, 39 and 41 extend inwards from side wall 1, while the alternate baffles 38 and 40 extend inwards from wall 2. The baffles 37, 38, 39, 40 and 41 are vertically oriented in a manner similar to baffles 11 and 12 described supra.

Referring now to FIG. 6, the overall combination of a multi-stage black liquor oxidizer with apparatus for breaking the generated foam including a defoaming vessel is illustrated in isometric view. The wood pulp process 42, which is any conventional type of pulping process that produces a black liquor, is provided with an outlet nozzle 43 which discharges a stream 44 consisting of weak black liquor to black liquor pump 45. The pump 45 passes the black liquor via duct 46 to the individual feed boxes 47 of the four stage oxidation tower defined between top plate 3 and bottom plate 4, which oxidizes the black liquor in four parallel vertically stacked units. Each of the four parallel oxidzer units is provided with an individual middle hoizontal perforated plate and vertical flow diversion baffles, not shown. Ambient air is passed into each of the oxidizer units in parallel via blower 48. The resulting mixture of foam and oxidized black liquor is removed from each oxidizer unit via an individual outlet nozzle 23, and the nozzles 23 discharge the mixture to a main conduit 49 for subsequent processing and elimination of foam.

Conduit 49 passes the mixture of foam and oxidized black liquor to a defoaming vessel which includes vertically oriented foam tank 50. Separated oxidized black liquor is removed from the lower part of tank 50 via nozzle 51 as stream 52, which is preferably subsequently processed to form regenerated green liquor by successive steps of evaporative concentration, high temperature reduction oxidation in a combustion furnace to form a smelt, and dilution of the smelted salts mixture to yield green liquor.

The foam tank 50 is provided with a plurality of upper mechanical foam breakers 53, which are driven by individual motors 54. The rising body of foam within tank 50 flows into breakers 53, and the foam is broken or dispersed into separate gaseous and liquid phases by mechanical means, as will appear infra. The separated liquid phase derived from foam is passed from each individual foam breaker 53 to manifold 55, and the collected liquor stream is passed from manifold 55 via duct 56 to the lower part of tank 50. The gaseous phase separated from the foam in each foam breaker 53 is individually passed to manifold 57, from which the entire gaseous phase is passed via transition conduit 58 to a tangential hoizontal inlet into cyclone 59, which serves to separate entrained liquid droplets from the gaseous phase. The separated liquid is passed from cyclone 59 via duct 60 to the lower part of tank 50, while the residual gaseous phase, which is now innocuous and is free of odorous components as well as liquid droplets, is dicharged to atmosphere via stack 61.

FIG. 7 illustrates one type of foam breaker which may be utilized in accordance with the present invention. The foam breaker unit 53 is mounted on the top of tank 50. The drive motor 54 is connected via gear coupling 62 to vertical shaft or rod 63, which extends downards into unit 53 and is connected to the center of the paddle 64. The motor 54 rotates the rod 63, which in turn rotates the paddle 64 about a central vertical axis, so that the paddle 64 disperses the foam by projecting the liquid component of the foam against the vertical side wall of unit 53. The separated gaseous phase is removed from unit 53 via duct 65, which passes the gaseous phase stream 66 to manifold 57, not shown. Nozzle 67 conducts the separated liquid to manifold 55, which in turn passes the liquid stream 68 to duct 56, not shown.

Numerous alternatives within the scope of the present invention will occur to those skilled in the art, besides those mentioned supra. The oxidizer container defined between side walls 1, 2, 28 and 29, may be rectangular as shown in FIGS. 2, 3 and 4, square as shown in FIG. 5, or of any other configuration. The perforations 6 in the foraminous plate 5 may be arranged in random configuration or the orderly patterns as shown in FIGS. 3 and 4, and perforations 6 may be circular, square, or irregular shaped, and may be punched or machined holes in plate 5. In some cases it will be desirable to provide a greater concentration of perforations 6 in plate 5 adjacent to the region of entry of the layer or film of black liquor from the feed box onto the plate 5. Air stream 7 may be ambient or preheated air, oxygen-enriched air, oxygen, etc., and unit 8 may be any suitable fan or blower, or a compressor such as a centrifugal unit. One or a plurality of vertically oriented flow diversion baffles such as elements 11, 12 or 37–41 may be provided in practice, however in most instances it will be desirable to provide a plurality of such baffles so as to cause the mixture of foam and black liquor to flow in a sinuous or serpentine flow path. The feed box defined between top plate 15, outer side wall 16, bottom plate 17 and provided with baffles 18 and 21 is a preferred apparatus configuration within the scope of the present invention, for feeding a layer of black liquor to the upper surface of plate 5. Other suitable apparatus for this purpose will occur to those skilled in the art, such as a horizontal manifold aligned adjacent to wall 1 above plate 5 and provided with a horizontal liquor discharge slit or a plurality of perforations. The adjustable weir 25 may be omitted in some instances, and the perforations or openings 6 may be omitted adjacent to weir 25. The bottom of the opening in side wall 2, from which the nozzle 23 extends to discharge stream 24, will usually be contiguous with the upper surface of plate 5, however the bottom of the opening may be spaced above plate 5, especially in instances when weir 25 is omitted. Stream 27 may be passed directly into nozzle 14, together with stream 13. Other suitable means for disposal of the mixture of foam and black liquor discharged via nozzles 23 may be provided in practice, instead of the foam tank 50 and its appurtenances. Foam breaker may be provided directly within tank 50 in some instances, instead of or in addition to the units 53. The manifold 55 and duct 56 may be disposed within tank 50, or in some cases foam breakers may be provided which pass the separated liquid phase of the foam to the inner wall of tank 50, so that the separated liquid phase flows down the inner wall as a liquid film. Various types of suitable foam breakers may be employed in practice of the present invention. Thus, the paddle or blade 64 may be replaced in suitable instances by a suitable circular perforated centrifugal basket, which would be rotated by shaft 63. In some instances, the liquor being treated may not have the characteristics to form an extensive foam. In this case, the foam breakers 53 may be omitted, with gas-liquid separation being provided by the tank 50 per se together with cyclone units such as element 59. In some instances it may be desired to separately recover soap, which concentrates in the foam. In such instances, a suitable soap recovery system could be made part of the oxidation system, such as by passing the recovered liquid stream in duct 56 to a separate soap recovery facility. The oxidation system and apparatus may be used to oxidize black liquor of various commercial concentrations, which usually range from about 10% to about 55% solids concentration. The apparatus may be employed to oxidize other liquors formed in the black liquor facility, such as the condensate from multiple effect evaporators or the condensate recovered from digester blow gases. Finally, the apparatus may be employed to oxidize other process liquors different from those produced in the various wood pulping processes.

An example of an industrial application of the present invention will now be described.

EXAMPLE

A commercial oxidation plant was designed to handle 1500 liters per minute of weak black liquor sufficient for a daily output of 200 tons of pulp. The plant has been in total and successful operation, and essentially 100 percent oxidation efficiency has been achieved continuously, even though the liquor flow varies from 1150 to 1800 liters per minute and sodium sulfide content from 2.3 to 6.6 grams per liter. Even with all these variations in feed liquor, the plant provided essentially 100 percent oxidation.

In the oxidation plant, the total power is the sum of power required for the air fan, four foam breakers and pump. The selection of motors for fan and foam breakers must be made with provision of a safety margin, due to unpredictable quality and quantity of foam. The operating power requirement for the oxidation plant including fan, liquor pump and foam breakers is only 99 horsepower, equivalent to 0.495 HP per ton of pulp produced. Assuming an average cost per horsepower per year to be $40, the annual operating cost will be only $3,960. This will be paid off in manifold in terms of sulfur recovery, lime savings and other benefits of oxidation.

The stack gases leaving the oxidation system were analyzed to determine whether any of the sulfur bearing gases, such as hydrogen sulfide, mercaptans, dimethyl sulfide and dimethyl disulfide, were released to atmosphere. The total concentrations of sulfur bearing gases was below 25.0 p.p.m., which clearly indicates the performance efficiency of the oxidation system. The gases released to the atmosphere from the oxidation system stack are essentially free to odor.

The condensate from the multiple effect evaporators which concentrated the oxidized black liquor, including both the condensate from the liquor vapors and that from the jet condensers, amounts to a total of 660 liters per minute. Before the oxidation system was installed, the condensate was malodorous and it was not possible to discharge it directly in the effluent, or to reuse it in the process. The biochemical oxygen demand (BOD) and pH of condensates before and after oxidation was analyzed. The reduction in BOD is almost 28 percent, whereas the pH of the condensate moves from an acidic 6.5 figure to alkaline conditions of about 9.0. The odor is much less noticeable, thus making the condensate acceptable for use in the process as hot water, such as for brown stock washing. This results in a considerable saving in heat, as well as the elimination of a source of pollution.

In order to reduce the concentration of hydrogen sulfide in the flue gases leaving the stack of the concentrated liquor combustion and recovery furnace, in which the smelted salts mixture is produced, a direct contact evaporator and scrubber has a very predominant role. The use of oxidized black liquor in the evaporator and scrubber lowers the vapor pressure of hydrogen sulfide above the black liquor. The venturi evaporator scrubber, by providing sufficient effective mass transfer surface between the gas and liquor phases, also favors the reduction of hydrogen sulfide and sulfur dioxide concentrations. If oxidation is not practiced, the same venturi evaporator scrubber becomes a prime source for the release of hydrogen sulfide as carbon dioxide of the flue gas reacts with the sodium sulfide present in the unoxidized black liquor. But with the use of oxidized black liquor, absorption rather than desorption of hydrogen sulfide takes place.

In the commercial installation, a single stage venturi evaporator-scrubber was provided following the recovery furnace. In this venturi, simultaneous evaporation and dust scrubbing is done. The flue gases leaving the stack were the biggest source of air pollution, as both malodorous sulfur bearing gases and salt cake dust were released to the atmosphere. The concentration of hydrogen sulfide released to the atmosphere before installation of the oxidation system varied from a minimum of 570 p.p.m. to a maximum of 1160 p.p.m. After the oxidation system was installed, there was a noticeable odor reduction. The analysis of the stack gases indicated that the concentration of hydrogen sulfide is reduced by 98.5 percent. This significant reduction in the concentration of hydrogen sulfide clearly proved the effectiveness of oxidation as practiced in the present invention.

The oxidation of black liquor raises the sulfidity of the liquor, as more sulfur is retained in the liquor due to the formation of the more stable compounds sodium thiosulfate or sodium sulfate, by oxidation of the unstable sodium sulfide. The extent to which the sulfidity increases depends upon the oxidation efficiency and upon recovery furnace operation, and the system that follows the recovery furnace. Due to increased sulfur content in the liquor, there will be a considerable increase in the sulfur loss in the form of sulfur dioxide at the recovery furnace. With recovery systems using wet scrubbers behind the recovery furnace, a higher sulfidity is attained than with a system not using wet scrubbers behind the system. This is due to the fact that sulfur dioxide from furnace gas is absorbed in wet scrubbers.

At the commercial installation, the sulfidities of both green and white liquor were increased by oxidation. The average sulfidity of green and white liquor without oxidation was 18.2 and 22.6, respectively. With the oxidation of black liquor, the sulfidity of green liquor increased from 18.2 to 27.1, a 47.1 percent increase, whereas the sulfidity of white liquor increased from 22.6 to 27.9, a 23.4 percent increase. This significant change in sulfidity agrees with low sulfur losses in the recovery furnace stack gases.

Finally, the increase in sulfidity due to oxidation also results in the lowering of lime requirement for the causticizing plant. On the average, the lime requirement was decreased by 0.01 kg. of lime per liter per minute of green liquor, which amounted to a 15.4 percent reduction. This is equivalent to an average reduction of 213 kg. of lime per hour. This lower lime requirement also reduces the load on the lime kiln and saves the fuel for reburning the lime. This amounts to $17,200 per year, assuming fuel cost at 2.4 cents per liter.

In summary, with respect to operating conditions in the commercial oxidation installation, an oxidation tower is provided in which four parallel horizontal oxidation stages are vertically stacked, as shown in FIG. 6. The liquor to be oxidized contained about 16% solids concentration including about 4.0 grams per liter of sodium sulfide. The liquor is pumped to the oxidation tower and is equally distributed to each stage with a manifold arrangement. The air is also distributed to each stage with a manifold arrangement. The air at about 60 cm. water gauge static pressure passes through the lower air chamber and then through the perforations, and contacts the liquor which is flowing in a zigzag manner on the plates. The ratio of perforated area to total area of the plates is 0.0435; and the ratio of air flow to liquor flow is about 0.15 cubic meters per liter. The retention time for liquor on the plates is only about 4.2 minutes. The air, foam and liquor from each stage then enter the foam tank through a manifold. In the foam tank, the liquor is separated from air and foam, which then enter the foam breakers. The foam is converted into liquor and the clean air then enters a cyclone, where any entrained black liquor is separated, before air is finally exhausted to atmosphere. The total pressure drop for the oxidation system, from fan outlet to cyclone outlet, is 55 cm. water gauge. The foam tank also usually serves as a storage for oxidized liquor.

What is claimed is:

1. An apparatus for the oxidation of black liquor with air which comprises a vertically oriented container, said container having a top closure plate and a bottom closure plate, a horizontal air diffusion plate provided with a plurality of spaced apart perforations, said horizontal perforated plate being disposed within said container and spaced between said top closure plate and said bottom closure plate, with the entire perimeter of said perforated plate being in contact with the side walls of said container, means to pass an air stream into said container below said horizontal perforated plate, whereby said air stream divides into a plurality of portions which flow upwards through said perforations in said perforated plate, at least one vertically oriented baffle plate, said baffle plate extending upwards within said container from said perforated plate, with a first vertical end of said baffle plate being in contact with a side wall of said container and the opposite second vertical end of said baffle plate being spaced away from the wall of said container, means to form a stream of black liquor into a horizontal layer, said means to form a layer including a feed box, said box being juxtaposed with said container and having a lower black liquor outlet opening, inlet means to pass black liquor into said feed box adjacent to the outer side of said box opposite to said lower outlet opening, a first vertical internal baffle within said box, said first internal baffle extending downwards from the top of said box adjacent to said inlet means and terminating above the bottom of said box, whereby black liquor flows downwards within said box between the outer side of said box and said first internal baffle and inwards between the bottom end of said first internal baffle and the bottom of said box, a second vertical internal baffle within said box, said second internal baffle extending upwards from the bottom of said box between said first internal baffle and said container and terminating below the top of said box, whereby black liquor flows upwards between said first internal baffle and said second internal baffle, over the top of said second internal baffle, downwards as a uniform layer of black liquor between said second internal baffle and said container, and through said lower black liquor outlet opening from said box and into said container through a contiguous horizontal slit opening in the side wall of said container above said perforated plate and adjacent to said first vertical end of said baffle plate, said black liquor layer stream thereby flowing horizontally and uniformly across the upper surface of said perforated plate adjacent to one side of said baffle plate, through the spacing between said second vertical end of said baffle plate and the wall of said container, and across the upper surface of said perforated plate adjacent to the opposite side of said baffle plate, whereby said black liquor layer stream flows transverse to and in contact with the air stream portions rising through said plurality of perforations, said air stream portions being thereby dispersed into said black liquor stream whereby said black liquor stream is oxidized and a foam is generated, and horizontal means above and contiguous with said perforated plate to remove the resulting mixture of foam, air and oxidized black liquor from said container through the side wall of said container above said horizontal perforated plate.

2. An apparatus for the oxidation of black liquor with air which comprises a vertically oriented container, said container having a top closure plate and a bottom closure plate, a horizontal air diffusion plate provided with a plurality of spaced apart perforations, said horizontal perforated plate being disposed within said container and spaced between said top closure plate and said bottom closure plate, with the entire perimeter of said perforated plate being in contact with the side walls of said container, means to pass an air stream into said container below said horizontal perforated plate, whereby said air stream divides into a plurality of portions which flow upwards through said perforations in said perforated plate, at least one vertically oriented baffle plate, said baffle plate extending upwards within said container from said perforated plate, with a first vertical end of said baffle plate being in contact with a side wall of said container and the opposite second vertical end of said baffle plate being spaced away from the wall of said container, means to form a stream of black liquor into a horizontal layer, said means to form a layer including a feed box, said box being juxtaposed with said container and having a lower black liquor outlet opening, inlet means to pass black liquor into said feed box adjacent to the outer side of said box opposite to said lower outlet opening, a first vertical internal baffle within said box, said first internal baffle extending downwards from the top of said box adjacent to said inlet means and terminating above the bottom of said box, whereby black liquor flows downwards within said box between the outer side of said box and said first internal baffle and inwards between the bottom end of said first internal baffle and the bottom of said box, a second vertical internal baffle within said box, said second internal baffle extending upwards from the bottom of said box between said first internal baffle and said container and terminating below the top of said box, whereby black liquor flows upwards between said first internal baffle and said second internal baffle, over the top of said second internal baffle, downwards as a uniform layer of black liquor between said second internal baffle and said container, and through said lower black liquor outlet opening from said box and into said container through a contiguous horizontal slit opening in the side wall of said container above said perforated plate and adjacent to said first vertical end of said baffle plate, said black liquor layer stream thereby flowing horizontally and uniformly across the upper surface of said perforated plate adjacent to one side of said baffle plate, through the spacing between said second vertical end of said baffle plate and the wall of said container, and across the upper surface of said perforated plate adjacent to the opposite side of said baffle plate, whereby said black liquor layer stream flows transverse to and in contact with the air stream portions rising through said plurality of perforations, said air stream portions being thereby dispersed into said black liquor stream whereby said black liquor stream is oxidized and a foam is generated, and horizontal means above and contiguous with said perforated plate to remove the resulting mixture of foam, air and oxidized black liquor from said container through the side wall of said container above said horizontal perforated plate, said horizontal means to remove the resulting mixture including a horizontal cylindrical conduit, said conduit extending from a circular opening in the side wall of said container, with the bottom of said opening being contiguous with said horizontal perforated plate, and a vertical weir, said weir having a horizontal upper end and being disposed across the lower part of said circular opening, whereby a layer of black liquor is maintained on the upper surface of said horizontal perforated plate.

3. An apparatus for the oxidation of black liquor with air to produce an oxidized black liquor substantially free of foam which comprises a vertically oriented rectangular container, said container having a top horizontal closure plate and a bottom horizontal closure plate, a horizontal air diffusion plate provided with a plurality of spaced apart perforations, said horizontal perforated plate being disposed within said container and spaced between said top closure plate and said bottom closure plate, with the entire perimeter of said perforated plate being in contact with the side walls of said container, means to pass an air stream into said container below said horizontal perforated plate, whereby said air stream divides into a plurality of portions which flow upwards through said perforations in said perforated plate, a plurality of parallel vertically oriented baffle plates, said baffle plates being spaced apart and extending upwards within said container from said perforated plate, with alternate baffle plates extending from contact with a first side wall of said container and terminating adjacent to the opposite side wall of said container, and the remaining baffle plates extending from contact with said opposite side wall of said container and terminating adjacent to said first side wall of said container, means to form a stream of black liquor into a horizontal layer, said means to form a layer including a feed box, said box being juxtaposed with said container and having a lower black liquor outlet opening, inlet means to pass black liquor into said feed box adjacent to the outer side of said box opposite to said lower outlet opening, a first vertical internal baffle within said box, said first internal baffle extending downwards from the top of said box adjacent to said inlet means and terminating above the bottom of said box, whereby black liquor flows downwards within said box between the outer side of said box and said first internal baffle and inwards between the bottom end of said first internal baffle and the bottom of said box, a second vertical internal baffle within said box, said second internal baffle extending upwards from the bottom of said box between said first internal baffle and said container and terminating below the top of said box, whereby black liquor flows upwards between said first internal baffle and said second internal baffle, over the top of said second internal baffle, downwards as a uniform layer of black liquor between said second internal baffle and said container, and through said lower black liquor outlet opening from said box and into said container through a contiguous horizontal slit opening in the side wall of said container above said perforated plate, whereby said black liquor layer stream flows horizontally and uniformly across the upper surface of said perforated plate adjacent to the sides of said baffle plates and through the open spacing between each baffle plate and the adjacent side wall of said container, said black liquor layer stream thereby following a serpentine flow path in flowing across the upper surface of said horizontal perforated plate, and whereby said black liquor layer stream flows transverse to and in contact with the air stream portions rising through said plurality of perforations, said air stream portions being thereby dispersed into said black liquor stream whereby said black liquor stream is oxidized and a foam is generated above said perforated plate, horizontal means above and contiguous with said perforated plate to remove the resulting mixture of foam, air and oxidized black liquor from said container through the side wall of said container above said horizontal perforated plate, said horizontal means to remove the resulting mixture extending to a vertically oriented defoaming vessel, said defoaming vessel being provided with lower means for removal of oxidized black liquor free of foam and upper mechanical means for breaking foam into separate liquid and gaseous phases, means to pass said separated liquid phase from said mechanical foam breaking means to the lower section of said defoaming vessel, and means to discharge said separated gaseous phase and said air to atmosphere.

4. An apparatus for the oxidation of black liquor with air to produce an oxidized black liquor substantially free of foam which comprises a vertically oriented rectangular container, said container having top horizontal closure plate and a bottom horizontal closure plate, a horizontal air diffusion plate provided with a plurality of spaced apart perforations, said horizontal perforated plate being disposed within said container and spaced between said top closure plate and said bottom closure plate, with the entire perimeter of said perforated plate being in contact with the side walls of said container, means to pass an air stream into said container below said horizontal perforated plate, whereby said air stream divides into a plurality of portions which flow upwards through said perforations in said perforated plate, a plurality of parallel vertically oriented baffle plates, said baffle plates being spaced apart and extending upwards within said container from said perforated plate, with alternate baffle plates extending from contact with a first side wall of said container and terminating adjacent to the opposite side wall of said container, and the remaining baffle plates extending from contact with said opposite side wall of said container and terminating adjacent to said first side wall of said container, means to form a stream of black liquor into a horizontal layer, means to pass said layer stream of black liquor horizontally from said means to form a layer into said container through a horizontal slit opening in the side wall of said container above said perforated plate, whereby said black liquor layer stream flows horizontally and uniformly across the upper surface of said perforated plate adjacent to the sides of said baffle plates and through the open spacing between each baffle plate and the adjacent side wall of said container, said black liquor layer stream thereby following a serpentine flow path in flowing across the upper surface of said horizontal perforated plate, and whereby said black liquor layer stream flows transverse to and in contact with the air stream portions rising through said plurality of perforations, said air stream portions being thereby dispersed into said black liquor stream whereby said black liquor stream is oxidized and a foam is generated above said perforated plate, horizontal means above and contiguous with said perforated plate to remove the resulting mixture of foam, air and oxidized black liquor from said container through the side wall of said container above said horizontal perforated plate, said horizontal means to remove the resulting mixture including a horizontal cylinder conduit, said conduit extending from a circular opening in the side wall of said container, with the bottom of said opening being contiguous with said horizontal perforated plate, and a vertical weir, said weir having a horizontal upper end and being disposed across the lower part of said circular opening, whereby a layer of black liquor is maintained on the upper surface of said horizontal perforated plate, said horizontal means to remove the resulting mixture extending to a vertically oriented defoaming vessel, said defoaming vessel being provided with lower means for removal of oxidized black liquor free of foam and upper mechanical means for breaking foam into separate liquid and gaseous phases, means to pass said separated liquid phase from said mechanical foam breaking means to the lower section of said defoaming vessel, and means to discharge said separated gaseous phase and said air to atmosphere.

References Cited

UNITED STATES PATENTS 2,027,115   1/1936   Oman et al. _____ 159—16
2,378,157   6/1945   Ramseyer et al. ____ 261—114X
3,425,899   2/1969   Milsson _____ 162—30

JAMES H. TAYMAN, JR., Primary Examiner

U.S. Cl. X.R.

23—49, 283; 159—16, 23, 47; 162—30; 252—361; 261—113